April 18, 1967   A. F. KOPASKA   3,314,386
MINIMUM TILLAGE IMPLEMENT
Original Filed Aug. 3, 1964   2 Sheets-Sheet 1

INVENTOR
ARNOLD F. KOPASKA
BY
Dick & Zarley
ATTORNEYS

April 18, 1967 A. F. KOPASKA 3,314,386
MINIMUM TILLAGE IMPLEMENT
Original Filed Aug. 3, 1964 2 Sheets-Sheet 2
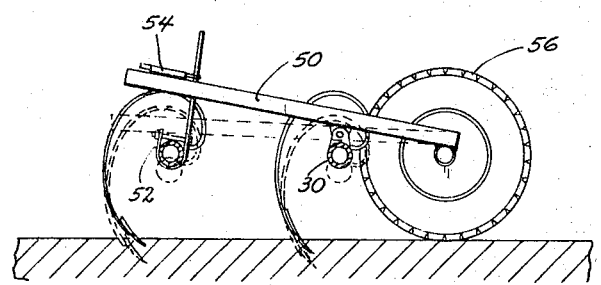
Fig. 6
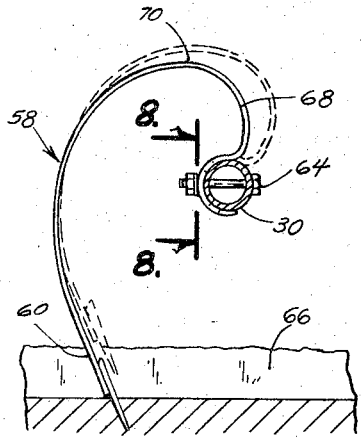
Fig. 7
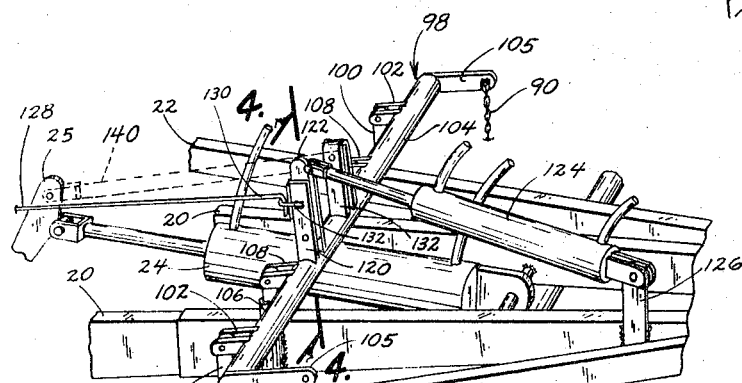
Fig. 3
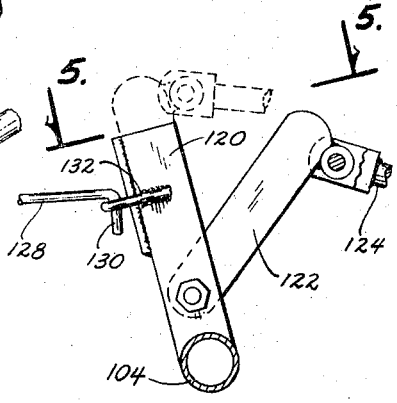
Fig. 4
Fig. 5
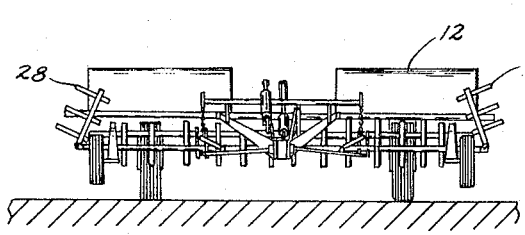
Fig. 10
INVENTOR
ARNOLD F. KOPASKA
BY Dick + Zarley
ATTORNEYS

United States Patent Office 3,314,386
Patented Apr. 18, 1967

3,314,386
MINIMUM TILLAGE IMPLEMENT
Arnold F. Kopaska, Guthrie Center, Iowa 50115
Continuation of abandoned application Ser. No. 386,927, Aug. 3, 1964. This application Oct. 27, 1966, Ser. No. 590,092
13 Claims. (Cl. 111—52)

This application is a continuation of application Ser. No. 386,927, filed Aug. 3, 1964, now abandoned.

This invention relates to a farm implement and in particular to a minimum tillage tool capable of working the soil and planting seed in one operation.

It is one of the principal objects of this invention to provide a farm implement having a planter assembly and a ground conditioning assembly all part of one machine unit.

It is a still further object of this invention to provide a ground conditioning assembly which is mounted between the planter assembly and the pulling vehicle.

A related object of this invention is to provide a farm implement wherein the ground conditioning assembly and the planter assembly may be raised and lowered simultaneously or independently of each other.

A still further object of this invention is to provide a farm implement having a ground conditioning assembly carried thereon and capable of moving laterally between predetermined limits.

Another object of this invention is to provide a farm implement having a ground conditioning assembly wherein individual ground engaging members are selectively adjustable to obtain the desired depths.

A further object of this invention is to provide a farm implement having a ground conditioning assembly carried thereon wherein the farm implement has a pair of transversely extending frame members carrying ground engaging elements and the frame members are pivotally connected to a ground engaging wheel and means is provided for varying the relative height of the frame members above the ground by pivoting them about the axis through the wheel.

A still further object of this invention is to provide a farm implement having a ground conditioning assembly mounted thereon wherein a power means is operable to raise the assembly above the ground and gravity serves to lower the assembly.

A related object of this invention is to provide a farm implement having a ground conditioning assembly mounted thereon wherein means is provided for removing the load from the power means for raising and lowering the farm implement.

A still further object of this invention is to provide a farm implement having wing sections which are pivotally mounted thereon and are provided with connecting means therebetween for permitting a limited amount of flexing of the wing units relative to the main unit.

A further object of this invention is to provide a minimum tillage implement which is simple in design, economical to manufacture and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings, in which:

FIG. 3 is a fragmentary perspective view of the ground conditioning implement illustrating in particular its mounting to the tongue of the planter;

FIG. 4 is a side elevation view taken along line 4—4 in FIG. 3 showing in particular the means for connecting a power cylinder to the ground conditioning implement for raising and lowering the same;

FIG. 5 is a top fragmentary view taken along line 5—5 in FIG. 4;

FIG. 6 is a side elevation view taken along line 6—6 in FIG. 1 and showing in particular the vertical adjustment capable by pivoting the ground conditioning implement about an axis through the ground conditioning implement wheels;

FIG. 7 is a side elevation view taken along line 7—7 in FIG. 1 and showing in particular the construction of a ground working member and its adjustable connection to the frame of the ground conditioning implement;

FIG. 8 is a fragmentary elevation view taken along line 8—8 in FIG. 7;

FIG. 10 is a front elevation view of the seed planter and ground conditioning farm implement.

Figure 1:
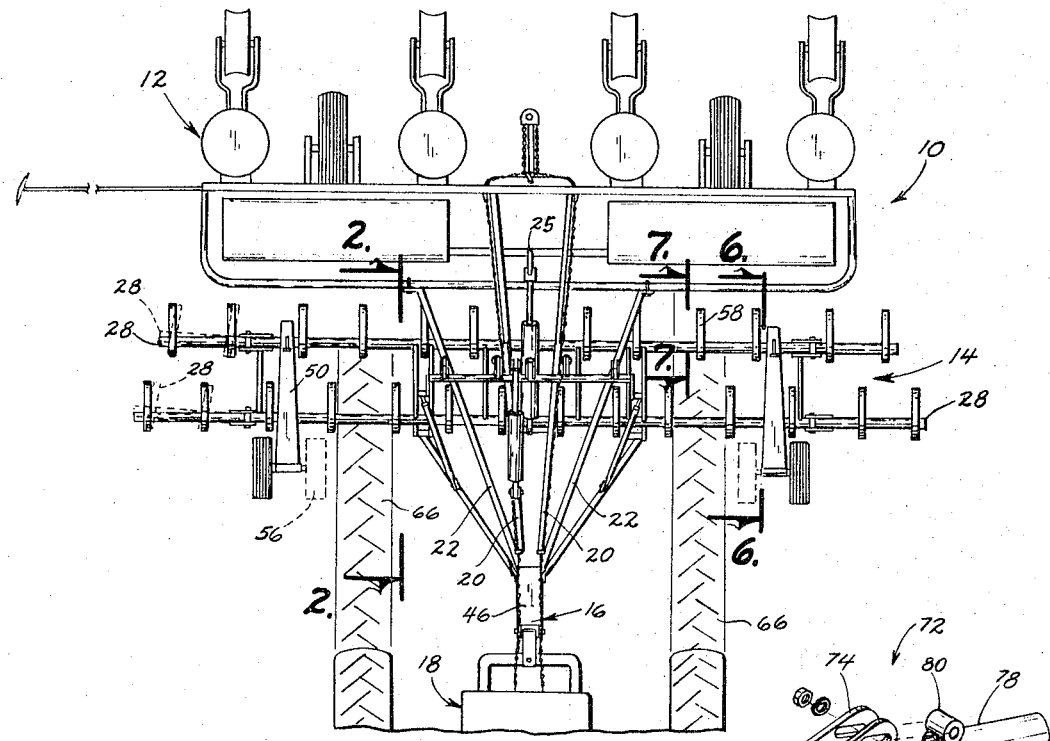
FIG. 1 is a top plan view of the farm implement of this invention showing in particular the seed planter and the ground conditioning implement mounted on the tongue of the planter between the tractor and the planter.

In FIG. 1 of the drawings the farm implement of this invention is referred to generally by the reference numeral 10 it includes a conventional corn planter 12 with a ground conditioning implement 14 carried on the tongue assembly 16 of the planter 12. A tractor 18 is shown connected to the tongue 16 for pulling the machine.

The tongue assembly 16 of the planter 12 has been extended from its normal length and includes a first pair of V-shaped frame members 20 positioned within a second pair of V-shaped frame members 22. A hydraulic cylinder 24 is connected at one end between the tongue frame members 20 and extends rearwardly thereof where it is pivotally connected to an upstanding post plate member 25 mounted on the planter. As the cylinder 24 is expanded the seed planter is raised above the ground and conversely when the cylinder 24 is contracted the planter is lowered relative to the ground.

Figure 2:
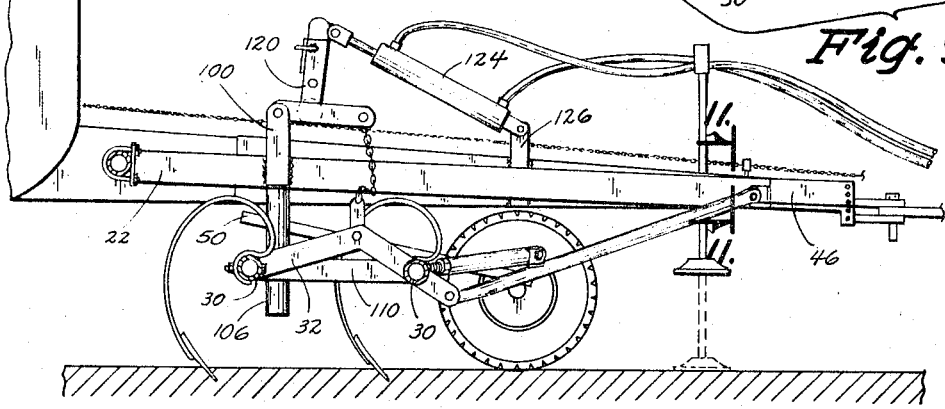
FIG. 2 is a side elevation view taken along line 2—2 in FIG. 1 showing the ground conditioning implement and its mountings to the tongue of the planter.
Figure 11:
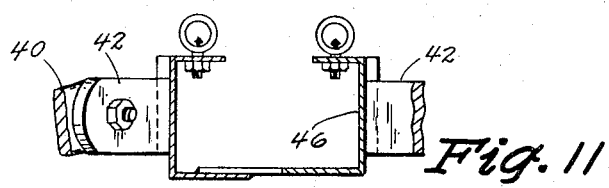
FIG. 11 is an elevational cross-sectional view taken along line 11—11 in FIG. 2 showing in particular the construction of the planter tongue and means carried thereon for connection with the ground conditioning implement.

The ground conditioning implement 14 as illustrated in the drawings in particular FIGS. 1, 2 and 3 includes a center unit 26 and a pair of wing units 28 at opposite ends thereof. The center unit 26 has a frame including a pair of tubular members 30 interconnected by two pairs of parallel spaced apart plate members 32. The frame members 30 extend transversely of the line of travel of the planter 12 and are positioned under the tongue frame members 20 and 22. In each pair of plate members 32 a pin 34 extends therebetween and has an upstanding plate element 36 affixed thereto. An adjustable brace member 38 extends from the pin element 34 towards the front end of the tongue assembly 16 where it is pivotally connected to an auxilary brace 40. The auxiliary brace 40 is in turn pivotally connected to the forward end of the plate members 32. The forward end of the brace 40 is hingedly connected to an ear element 42 welded or otherwise secured to a channel-shaped hitch unit 46 which additionally joins the intersecting ends of the tongue frame members 20 and 22.

As best illustrated in FIG. 6, an arm member 50 is pivotally connected to the forward tubular frame member 30. A J-shaped clamp 52 embraces the rear frame member 30 and extends upwardly through the arm member 50 and is adjustably connected thereto by a latch 54. A ground engaging wheel 56 is rotatably mounted on the forward end of the arm 50 and provides for an axis of pivotal movement for the arm 50 in adjusting the relative height of the forward and rear frame members 30 as illustrated in FIG. 6. The dash lines in FIG. 1 for the wheel 56 are to indicate that dual wheels may be provided on each end of the ground conditioning implement 26 or that the wheel 56 represented by the solid lines may be moved to the inside of the arm 50 from the outside position as shown.

Each of the transversely extending frame members 30 are provided with a plurality of spring teeth members 58 as best illustrated in FIG. 7. The spring teeth members 58 are formed from a length of spring steel material having a ground engaging end 60 and a slot 62 (FIG. 8) formed in the opposite end. The slot 62 extends lengthwise of the tooth member 58 and receives a bolt assembly 64 which extends through the frame member 30 whereby the tooth member 58 may be vertically adjusted to obtain the desired depth. This is important as illustrated in FIG. 1 wherein the depression 66 left by the tractor tires require that the tooth members 58 following behind the tractor tracks must be moved to a lower position than tooth members at each side of the tractor track 66. The shape of the tooth member 58 is illustrated in detail in FIG. 7 and includes an arcuate end having the slot 62 from which the length of spring material extends upwardly and forwardly at 68 and therefrom a portion 70 extends upwardly and rearwardly terminating in a downwardly extending ground engaging portion 60.

Figure 9:
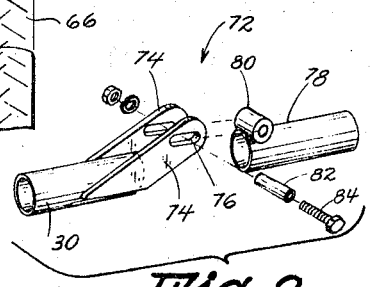
FIG. 9 is a fragmentary view of the connecting means between the main ground conditioning implement and the wing units at each end thereof whereby pivotal movement of the wing units in both vertical and horizontal planes is permitted.

To increase the ease of portability of the implement 10, the wing units 28 on the ground conditioning implement 14 may be folded about horizontal axis onto the center section as illustrated in FIG. 10. To provide flexibility in the wing units 28 in the event that an obstruction is hit by one of the tooth members 58 carried thereon, a specially designed connecting assembly 72 as shown in FIG. 9 has been provided. It will be noted that the coupling 72 has been reversed in its position between the rear frame member 30 and the forward frame member 30 as best seen in FIG. 1. Referring to the rear frame member 30 it is seen that a pair of plates 74 extend in parallel relationship outwardly and at an acute angle thereto. Each of these plates 74 are provided with elongated slots 76 which are disposed along a line parallel to the frame member 30. A frame member 78 of tubular construction similar to the frame member 30 is provided with a tongue element 80 on its inner end and disposed in a position offset from the longitudinal axis of the frame member 78. The tongue element 80 is in the form of a bearing element and is adapted to be positioned between the plates 74 with its center opening aligned with the elongated slot 76. A sleeve 82 is positioned within the tongue 80 and has a length sufficient to extend into the slot 76 of the plate 74. A bolt assembly 84 then extends through the sleeve 82 and bears against the outer side walls of the plate elements 74. It is seen then that the frame member 78 of the wing unit 28 may readily pivot in a vertical plane relative to the associated frame member 30 and additionally may pivot slightly rearwardly to the dash line position as shown in FIG. 1.

The ground conditioning implement 14 is adjustably supported in a floating manner by the tongue 16 through a pair of chains 90 extending between the upstanding post 36 on the implement 14 and in turn connected to a rocker arm assembly 98 mounted on the tongue 16 as best illustrated in FIG. 3. An upstanding plate post 100 is fixedly connected to each of the tongue frame members 22 and is pivotally connected at its upper end through a clevis 102 to elongated transversely extending rocker shaft 104. At the outer ends of the rocker shaft 104, a pair of horizontally extending plate members 105 are provided and are connected at their outer ends to the upper ends of the chains 90. Each of the tongue frame members 20 also have posts 106 secured by weld or like thereto in a vertical plane. The upper ends of the posts 106 are pivotally connected to clevises 108 fixedly secured to the rocker shaft 104. The lower end of the upstanding post 106 extends below the frame members 20 and below the plane of the frame members 30 of the ground conditioning implement 14 and are positioned closely adjacent to frame members 110 extending between the frame members 30. Thus the ground conditioning implement 14 may float transversely of the tongue 16 until the frame members 110 abut against the upstanding post 106 on either side of the tongue 16.

A forwardly facing upstanding channel member 120 is fixedly secured to the rocker shaft 104 near its center area above the power cylinder 25. A plate member 122 is fitted within the channel member 120 and is pivotally connected to its side walls at the lower end of the plate member. At the upper end of the plate member 122, a power cylinder 124 is connected at one end and extends to an upstanding post 126 affixed to the frame member 20 as shown in FIG. 3. Thus it is seen that as the cylinder 124 is expanded the plate member 122 pivots rearwardly into the channel member 120 and forces the rocker shaft 104 in a counter-clock-wise direction as viewed in FIG. 3 thereby lifting the implement 14 off of the ground.

To hold the implement 14 off of the ground and take pressure off of the power cylinder 124, a locking arrangement has been provided connecting the channel member 120 to the planter 12. This locking arrangement includes a rod 128 which is connected to the planter frame and has at its opposite end a hook 130 for detachable engagement with an eye 132 mounted near the top of the channel member 120. Accordingly, as seen in FIG. 4 the power cylinder 124 may move the upstanding channel member 120 to its position for engagement with the locking assembly 128 (the power cylinder and member 122 being shown in dash lines) and then the power cylinder may be retracted to its solid line position to minimize pressure thereon and to positively hold the ground conditioning implement 14 in its raised position.

An alternate arrangement for raising and lowering the ground conditioning implement 14 is illustrated in FIG. 3 by the dash lines representing a connecting link 140 pivotally connected to the upstanding member 25 on the planter and in turn extending to a U-shaped upstanding member 132 fixedly secured to the top side of the rocker shaft 104. By use of the link member 140 it is seen that the power cylinder 25 will cause the implement 14 to be raised and lowered as the planter 12 is being raised and lowered. To have maximum flexibility, it is ordinarily preferable to use both power cylinders 25 and 124 so that the planter and the ground conditioning implement may be raised and lowered independently of each other.

Some changes may be made in the construction and arrangement of my minimum tillage implement without departing from the real spirit and purpose of my invention, and it is my intention to cover by my claims, any modified forms of structure or use of mechanical equivalents which may be reasonably included within their scope.

I claim:
1. In combination,
   a seed planter having a forwardly extending tongue assembly for detachable engagement with a prime mover,
   means on said planter for lowering and raising said planter relative to the ground,
   a ground working implement positioned forwardly of said planter and rearwardly of the forward end of said planter tongue, said implement extending transversely of said tongue, said implement having a frame extending parallel to the longitudinal axis of said implement, a pair of plates extending in parallel relationship outwardly of said frame and at an acute angle thereto, said implement further including a wing implement section, a tongue member on the inner end of said wing implement section and disposed in a position offset from the longitudinal axis of said wing section, means pivotally connecting said pair of plates to said tongue member, and said tongue member including a hollow bearing member having a length greater than the distance between said pair of plates, said pair of plates having a slot formed in each end, said bearing member being received therein with said means pivotally connecting said pair of plates to said tongue member extending through said bearing member.

2. In combination, a seed planter having a forwardly extending tongue assembly for detachable engagement with a prime mover, means on said planter for lowering and raising said planter relative to the ground, a ground working implement positioned forwardly of said planter and rearwardly of the forward end of said planter tongue, said implement extending transversely of said tongue, said implement including a pair of spaced apart frame members disposed in parallel relationship to the longitudinal axis of said implement, ground working means on each of said pair of frame members, a frame portion integrally interconnecting said pair of frame members, and a wheel support arm pivotally connected intermediate its ends to the forward frame member of said pair of frame members, said arm extending rearwardly to said other frame member, means for adjustably connecting said arm to said other frame member to permit pivotal movement of said arm about its pivotal axis through said forward frame member, and a wheel rotatably mounted on the forward end of said arm forwardlly of said forward frame member.

3. In combination, a seed planter having a forwardly extending V-shaped tongue assembly for detachable engagement with a prime mover at the converging end of said tongue assembly, means on said planter for lowering and raising said planter relative to the ground, a ground working implement positioned forwardly of said planter and rearwardly of the forward end of said planter tongue, said implement extending transversely of said planter tongue, a second V-shaped tongue assembly having side members embracing said first tongue assembly and having their converging ends pivotally connected to the forward end of said first tongue assembly, said rearwardly extending ends of said second tongue assembly being connected to said implement, a pair of spaced apart implement support wheels secured to said implement, and means for selectively adjusting the height of said implement relative to the axis of rotation of said implement wheels, and means for raising and lowering said implement relative to the ground and pivoting said implement about the axis of the pivotal connection of said tongue assembly to said first tongue assembly.

4. The structure of claim 3 and an upstanding post secured to said planter tongue assembly and an arm pivotally connected thereto and rigidly connected to a shaft extending transversely of said planter tongue, and a second arm rigidly connected to said shaft on the side thereof opposite said first arm, means interconnecting said implement and the free end of said second arm on said shaft, and a power means connected to said shaft for raising and lowering said implement relative to the ground and pivoting said implement about the axis of the pivotal connection of said second tongue assembly to said first tongue assembly.

5. The structure of claim 3 and said planter supporting said implement only by means being transversely flexible connected to said tongue and in supporting engagement with said implement, stop means on said implement extending longitudinally of said planter, stop means on said tongue extending vertically adjacent said stop means on said implement and into the horizontal plane thereof, and said implement adapted to move transversely of the longitudinal axis of said planter until limited by co-action of said stop means on said tongue with said stop means on said implement.

6. The structure of claim 3 and a member pivotally mounted on said tongue, means interconnecting said member and said implement, an upstanding post on said member, a power means mounted on said tongue forwardly of said post, said power means being defined as fluid operated cylinder, said post having an element pivotally connected thereto and being pivotal about a horizontal axis, and stop means on said post for limiting rearward pivotal movement of said element, said cylinder having one end connected to said element on said post and upon pivoting said element rearwardly into engagement with said stop means said post is moved to a rearward position and said member is pivoted upwardly for raising said implement above the ground, and pivoting said implement about the axis of pivotal connection of said second tongue assembly to said first tongue assembly.

7. The structure of claim 6 wherein means is connected to said planter and detachably connected to said post for selectively maintaining said post in said rearward position.

8. The structure of claim 3 and said implement including a pair of spaced apart frame members disposed in parallel relationship to the longitudinal axis of said implement, ground working means on each of said pair of frame members, and a frame portion integrally interconnecting said pair of frame members, said ground working means being defined by a length of spring steel material having a ground engaging end and a slot formed in the opposite end, said slot extending lengthwise of said length of material, and adjustable means extending into said slot and engaging said frame member whereby said ground working means may be selectively adjusted vertically for engagement with the ground.

9. The structure of claim 8 wherein said opposite end of said length of material is secured by said adjustable means to the rear of said frame member and said length of material extends upwardly and forwardly therefrom and then upwardly and rearwardly terminating in a downwardly extending portion forming said ground engaging end of said length of material.

10. The structure of claim 4 and an upstanding post is provided on said shaft, said power means being a hydraulic cylinder having one end connected to said post and the opposite end connected to said planter tongue assembly.

11. The structure of claim 3 and a rigid vertically disposed member positioned adjacent to each leg of said V-shaped planter tongue assembly, and a means on said implement for engagement with each of said vertical members to limit movement of said implement laterally of said planter tongue assembly.

12. The structure of claim 3 wherein each of said wheels are positioned at the forward side of said implement.

13. The structure of claim 10 and a rigid member being provided for detachably extending between said upstanding post on said shaft and said planter tongue assembly for selectively locking said implement in a raised position.

(References on following page)

References Cited by the Examiner

UNITED STATES PATENTS

| | | | |
|---|---|---|---|
| 447,763 | 3/1891 | Coombs | 172—142 X |
| 604,343 | 5/1898 | Whipple | 172—390 |
| 1,004,854 | 10/1911 | Custer | 111—61 |
| 1,910,109 | 5/1933 | Klinkhammer et al. | 111—1 X |
| 2,337,749 | 12/1943 | Hand | 111—60 |
| 2,657,652 | 11/1953 | Graham | 111—8 X |
| 2,765,609 | 10/1956 | Oehler et al. | 172—466 X |
| 3,019,747 | 2/1962 | Strahan | 111—68 X |
| 3,033,296 | 5/1962 | Kaufman et al. | 172—456 X |
| 3,190,367 | 6/1965 | Kopaska | 172—456 |
| 3,208,536 | 9/1965 | Orendorff | 172—456 |

FOREIGN PATENTS

| | | |
|---|---|---|
| 75,221 | 12/1952 | Denmark. |
| 1,120,462 | 7/1956 | France. |
| 1,230,443 | 9/1960 | France. |

ABRAHAM G. STONE, *Primary Examiner.*

J. R. OAKS, *Assistant Examiner.*